United States Patent [19]

Nakai et al.

[11] Patent Number: 5,280,374
[45] Date of Patent: Jan. 18, 1994

[54] LIQUID CRYSTAL DISPLAY DEVICE AND METHOD OF COMPENSATING FOR A DEFECT

[75] Inventors: Shunji Nakai, Moriguchi; Toshio Maeda, Ikoma; Yasuo Mizokoshi, Nara, all of Japan

[73] Assignee: Sharp Kabushiki Kaisha, Osaka, Japan

[21] Appl. No.: 843,986

[22] Filed: Feb. 28, 1992

[30] Foreign Application Priority Data

| Mar. 1, 1991 | [JP] | Japan | 3-36279 |
| Mar. 1, 1991 | [JP] | Japan | 3-36280 |
| Mar. 29, 1991 | [JP] | Japan | 3-66501 |
| Mar. 29, 1991 | [JP] | Japan | 3-66503 |
| Jun. 4, 1991 | [JP] | Japan | 3-132967 |

[51] Int. Cl.⁵ .................. G02F 1/1337; G02F 1/1333
[52] U.S. Cl. ........................................ 359/67; 359/82
[58] Field of Search ................... 359/45, 82, 67, 54

[56] References Cited

U.S. PATENT DOCUMENTS

| 5,121,236 | 6/1992 | Ukai et al. | 359/59 |
| 5,142,386 | 8/1992 | Ishihara | 359/67 |

FOREIGN PATENT DOCUMENTS

| 0404072 | 12/1990 | European Pat. Off. |
| 60-243635 | 12/1985 | Japan |
| 1-068723 | 3/1989 | Japan |
| 2-127614 | 5/1990 | Japan |

Primary Examiner—William L. Sikes
Assistant Examiner—Ron Trice
Attorney, Agent, or Firm—David G. Conlin; Robert F. O'Connell

[57] ABSTRACT

A liquid crystal display device and a method of compensating for a luminance point defect of the liquid crystal display device. After a detective luminance point pixel is detected, a laser beam is irradiated from an excimer laser oscillator on a portion of a surface of one of glass substrates of a liquid crystal panel on which an illuminating light is incident, the portion being located on the same irradiation path of the illuminating light with the luminance point pixel. In this way, the portion is laseretched, thereby forming a rough surface in the portion. When such a panel is used in a projection device, the light transmitted through the luminance point pixel is scattered and so reduced. Accordingly, the defective luminance point pixel is inconspicuous to normal pixels around the defective luminance point pixel.

24 Claims, 8 Drawing Sheets

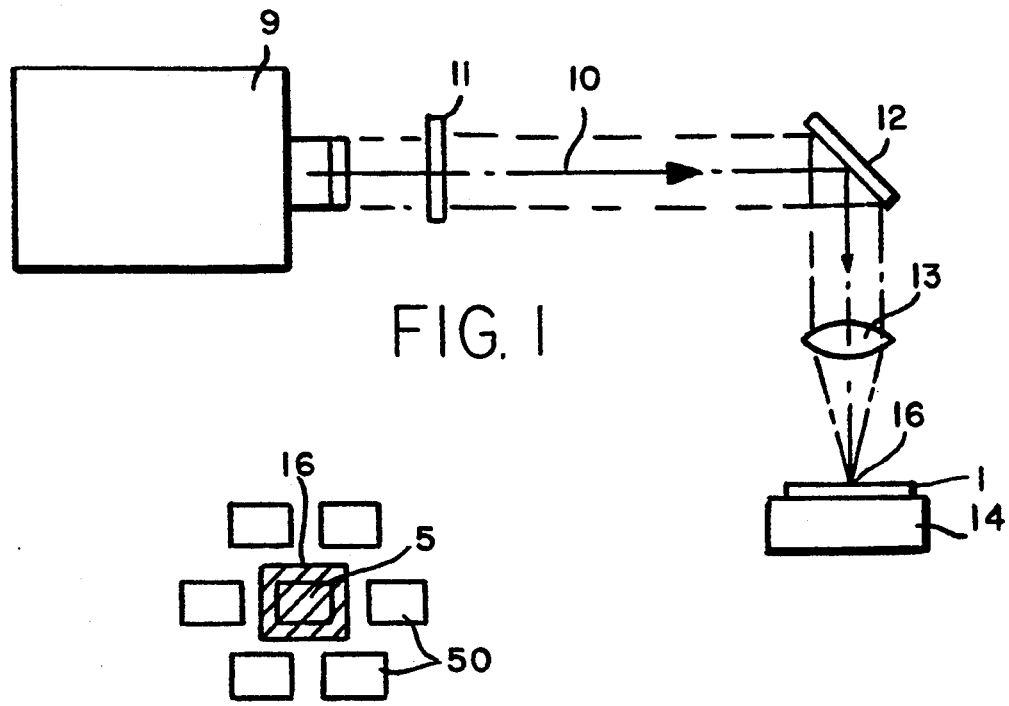
FIG. 1
FIG. 2
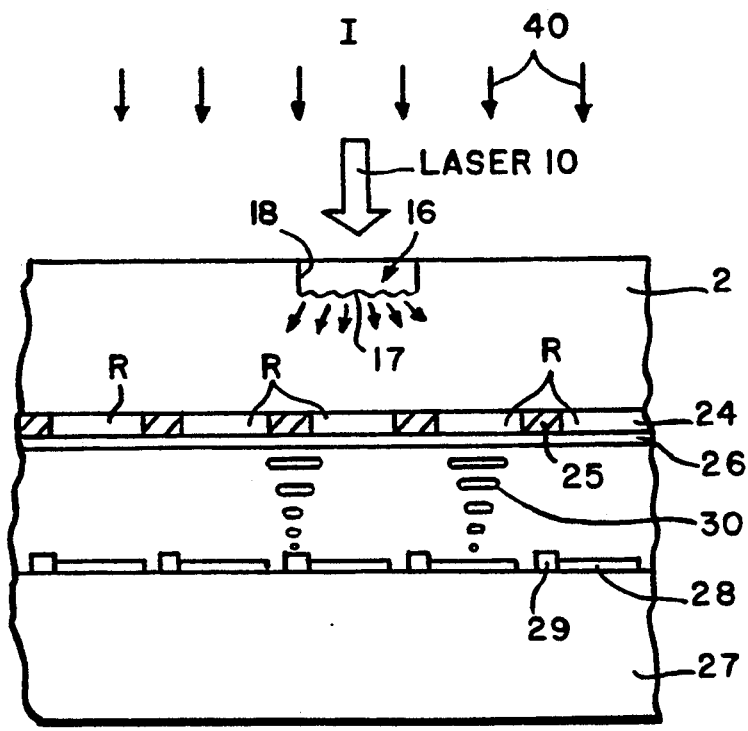
FIG. 3

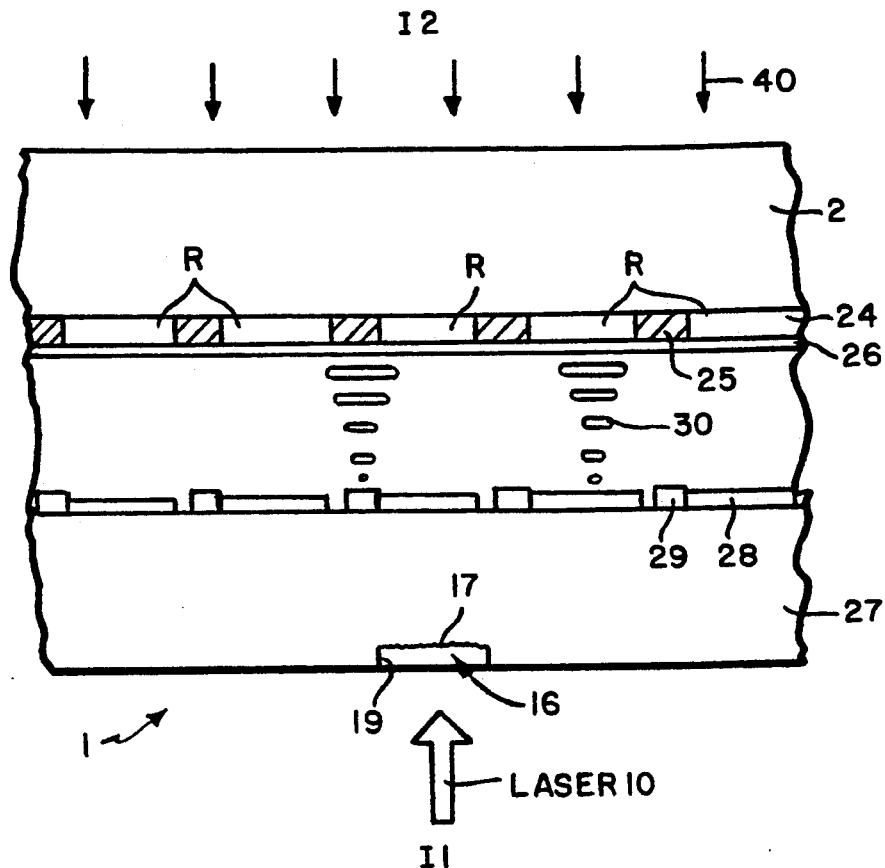
FIG. 18
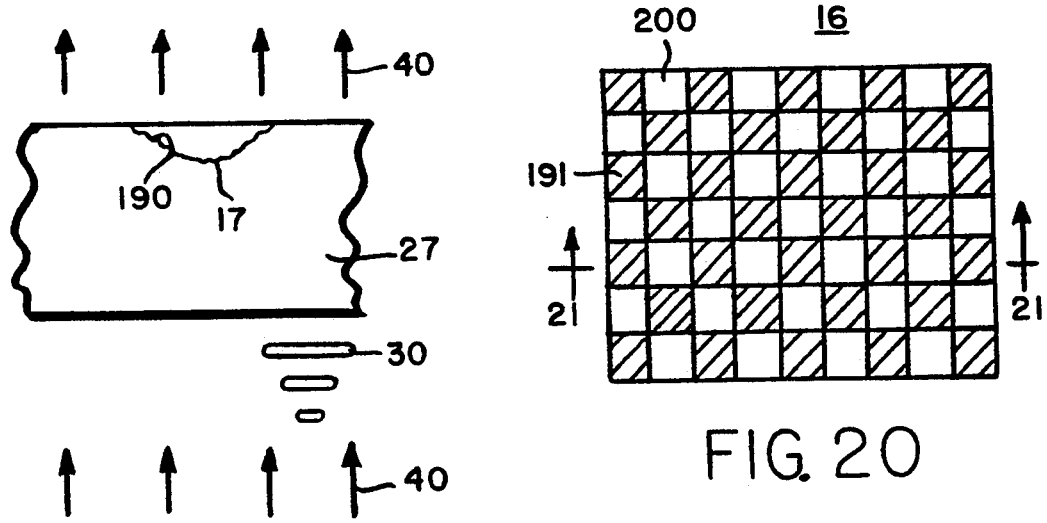
FIG. 19
FIG. 20

LIQUID CRYSTAL DISPLAY DEVICE AND METHOD OF COMPENSATING FOR A DEFECT

BACKGROUND OF THE INVENTION

1. Field of the Invention

The present invention relates to a liquid crystal display device comprising a transmission liquid crystal panel including a liquid crystal enclosed between a pair of transparent substrates and display pixels arranged in a matrix and a light source for irradiating an illuminating display light from a back of the transmission liquid crystal panel, and to a method of compensating for a luminance point defect of the transmission liquid crystal panel of the liquid crystal display device.

2. Description of the Prior Art

An example of this type of liquid crystal display device includes an active-matrix drive liquid crystal panel used for a projection device. This panel comprises a pair of glass substrates laminated to each other. One of the glass substrates has pixel electrodes arranged in a matrix on an inner surface thereof, and the pixel electrodes are connected to TFTS (thin film transistors). The pixel electrodes are selected by switching the TFTS, thereby displaying an image. In this construction, since no cross talk is generated as is generated in a simple matrix panel, a high quality display is realized.

The TFT has a multiple layer construction, in which a gate electrode, a source electrode, a drain electrode and the like are laminated on the glass substrate. The production procedure of the TFT is a repetition of the step of laminating such thin metal films on the glass substrate and the step of patterning the thin metal films by the use of a pattern mask. Accordingly, the production of a perfect TFT requires a great amount of effort to maintain and control various conditions in the production procedure.

It sometimes occurs that a defective TFT without normal TFT characteristics is produced. A defect which can be rectified is rectified in accordance with the type and the degree of the defect by the use of the appropriate rectifying technology. An example of a TFT defect is a luminance point defect, which is impossible to rectify on a circuit pattern and is recognized, for example, on a display screen in the form of a luminance point generated on pixels in correspondence with the pixel electrodes when the display screen is driven.

FIGS. 26 and 27 illustrate a conventional method of compensating for the luminance defect. An opaque shading film 206 is formed on a portion of a surface of a glass substrate 202, the portion being in correspondence with a luminance point pixel 205 of a liquid crystal panel 201. A light emitted from a light source (not shown) and incident on the luminance point pixel 205 is reduced by the opaque shading film 206, thereby making the luminance point pixel 205 inconspicuous.

Selected as the portion on which the opaque shading film 206 is formed, namely, a luminance point defect compensation area, is a portion through which the light from the light source is irradiated on the luminance point pixel 205. More practically, among irradiation paths of the light which is emitted from the light source, incident on the panel 201 through a condenser lens 207 and converged to a projecting lens 208, an irradiation path A passing through the luminance point pixel 205 passes through the compensation portion. FIG. 27 schematically shows that the luminance point pixel 205 and the opaque shading film 206 are on the same irradiation path. Among a pair of glass substrates 202 and 227, the glass substrate 202 is the one on which the light is incident. A liquid crystal as a display medium is enclosed between the glass substrates 202 and 227.

The opaque shading film 206 is formed in the following way: An ultraviolet-ray hardened resin ink is put on a fine curved surface at a tip of a marking needle and is transferred to the compensation area. Then, the ink is hardened by irradiating an ultraviolet ray, whereby the ink is adhered on the surface of the glass substrate 202. The opaque shading film 206 is extremely fine, although different in size depending on the type of the liquid crystal panel: the diameter is approximately 100 to 250 $\mu$m and the thickness is approximately 10 $\mu$m.

The above conventional method is limited in eliminating affects of the luminance point defect due to the following disadvantages:

(1) Since the opaque shading film 206 does not have an enough adhering force to the smooth glass substrate 202, the opaque shading film 206 is possibly peeled off from the glass substrate 202 or damaged when dust or the like is wiped off from the, glass substrate 202. Accordingly, it is poor in reliability.

(2) Since the opaque shading film 206 shutters the light almost perfectly, the opaque shading film 206 is recognized as a black point with the human eye when an image brightens the display screen. Accordingly, the compensation area is restricted within an end portion of the display screen.

SUMMARY OF THE INVENTION

A first object of the present invention is to provide a liquid crystal display device and a method of compensating for a luminance point defect of a liquid crystal panel of the liquid crystal display device for improving the reliability of compensation for a luminance point defect and for eliminating the inconvenience of a luminance point defect compensation area being restricted.

Another object of the present invention is to provide a liquid crystal display device and a method of compensating for a luminance point defect of a liquid crystal panel of the liquid crystal display device for further improving an effect of reducing an illuminating light transmitted through a luminance point pixel and thus further improving an effect of a luminance point defect compensation.

Still another object of the present invention is to provide a liquid crystal display device and a method of compensating for a luminance point defect of a liquid crystal panel of the liquid crystal display device which can be applied as a direct vision liquid crystal display device.

Still another object of the present invention is to provide a method of compensating for a luminance point defect of a liquid crystal panel of the liquid crystal display device, by which surface-roughening is conducted easily and a highly precise rough surface can be formed without damaging a precise shape of a glass substrate including a concave portion.

In the liquid crystal display device of this invention, which overcomes the above-discussed and numerous other disadvantages and deficiencies of the prior art, a processed concave portion is formed in a portion in the vicinity of a surface of one of transparent substrates on which an illuminating light is incident, the portion being located on an irradiation path of the illuminating light irradiated on a luminance point pixel having a luminance point defect, and the processed concave portion has a bottom which is rough so as to have a light scattering characteristic.

In a preferred embodiment of the invention, the bottom of the processed concave portion comprises deep steps and shallow steps arranged alternately.

In a preferred embodiment of the invention, the processed concave portion is formed to be narrower at the bottom thereof than at an upper opening thereof, and a side wall and the bottom of the processed concave portion are rough so as to have the light scattering characteristic.

In a preferred embodiment of the invention, the wall has a sawtooth-like roughness and the bottom has a mesh-like roughness.

In a preferred embodiment of the invention, the bottom of the processed concave portion is formed to have better light scattering characteristic at a central portion thereof than an ambient portion thereof.

In a preferred embodiment of the invention, the central portion of the bottom has a mesh-like roughness.

In a preferred embodiment of the invention, the central portion of the bottom has another processed concave portion which is deeper than the ambient portion and is narrower at a bottom thereof than at an upper opening thereof.

Alternatively, in the liquid crystal display device, a processed concave portion is formed in a portion in the vicinity of a surface of one of transparent substrates on which an illuminating light is incident, the portion being located on an irradiation path of the illuminating light irradiated on a luminance point pixel having a luminance point defect, and the processed concave portion has a bottom which is deep so as to be close to the luminance point pixel and is rough so as to have a light scattering characteristic.

In a preferred embodiment of the invention, the processed concave portion having the bottom which is rough so as to have a light scattering characteristic is formed by the use of an excimer laser beam.

Alternatively, in the liquid crystal display device, a processed concave portion is formed in a portion in the vicinity of a surface of one of the transparent substrates from which the illuminating light is outgoing, the portion being located on an irradiation path of the illuminating light irradiated on a luminance point pixel having a luminance point defect, and the processed concave portion has a bottom which is rough so as to have a luminance reducing effect.

In a preferred embodiment of the invention, the bottom of the processed concave portion comprises deep steps and shallow steps arranged alternately.

In a preferred embodiment of the invention, the bottom of the processed concave portion is formed to have a more excellent light scattering characteristic at a central portion thereof than an ambient portion thereof.

In a preferred embodiment of the invention, the central portion of the bottom has a-mesh-like roughness.

Alternatively, the method of compensating for a defect of a liquid crystal display device of this invention, which overcomes the above-discussed and numerous other disadvantages and deficiencies of the prior art, comprises the steps of: detecting a luminance point defect by irradiating an illuminating light on a transmission liquid crystal display panel; forming a processed concave portion in a portion in the vicinity of a surface of one of transparent substrates on which the illuminating light is incident, the portion being located on an irradiation path of the illuminating light irradiated on a luminance point pixel having a luminance point defect; and forming a rough surface having a light scattering area by surfaceroughening a bottom of the processed concave portion.

In a preferred embodiment of the invention, the method further comprises a step of forming deep steps and shallow steps arranged alternately on the bottom of the processed concave portion.

Alternatively, the method of compensating for a defect of a liquid crystal display device of this invention, which overcomes the above-discussed and numerous other disadvantages and deficiencies of the prior art, comprises the steps of: detecting a luminance point defect by irradiating an illuminating light on a transmission liquid crystal display panel; forming a processed concave portion which is narrower at a bottom thereof than an upper opening thereof in a portion in the vicinity of a surface of one of transparent substrates on which the illuminating light is incident, the portion being located on an irradiation path of the illuminating light irradiated on a luminance point pixel having a luminance point defect; and forming a light scattering area by surface-roughening a wall and the bottom of the processed concave portion.

In a preferred embodiment of the invention, the wall is surface-roughened to be sawtooth-like and the bottom is surface-roughened to be mesh-like.

Alternatively, the method of compensating for a defect of a liquid crystal display device of this invention, which overcomes the above-discussed and numerous other disadvantages and deficiencies of the prior art, comprises the steps of: detecting a luminance point defect by irradiating an illuminating light on a transmission liquid crystal display panel; forming a processed concave portion which has a rough bottom having a light scattering characteristic by surfaceroughening a portion in the vicinity of a surface of one of transparent substrates on which the illuminating light is incident, the portion being located on an irradiation path of the illuminating light irradiated on a luminance point pixel having a luminance point defect; and forming another processed concave portion at a central portion of the rough bottom of the processed concave portion, the forming another processed concave portion being deeper than the rough surface.

Alternatively, the method of compensating for a defect of a liquid crystal display device of this invention, which overcomes the above-discussed and numerous other disadvantages and deficiencies of the prior art, comprises the steps of: detecting a luminance point defect by irradiating an illuminating light on a transmission liquid crystal display panel; and forming a processed concave portion having a bottom which is close to a luminance point pixel having a luminance point defect and which is rough so as to have a light scattering characteristic by surfaceroughening a portion in the vicinity of a surface of one of transparent substrates on which the illuminating light is incident, the portion being located on an irradiation path of the illuminating light irradiated on the luminance point pixel.

In a preferred embodiment of the invention, the portion is surface-roughened by way of laser etching by the use of an excimer laser beam.

In a preferred embodiment of the invention, the excimer laser beam is irradiated on the a defect compensation area by way of reduction-slit-exposure through a slit pattern having a slit of an enlarged shape of an outline of the defect compensation area.

Alternatively, the method of compensating for a defect of a liquid crystal display device of this invention, which overcomes the above-discussed and numerous other disadvantages and deficiencies of the prior art, comprises the steps of: detecting a luminance point defect by irradiating an illuminating light on a transmission liquid crystal display panel; and forming a processed concave portion in a portion in the vicinity of a surface of one of transparent substrates from which the illuminating light is outgoing, the portion being located on an irradiation path of the illuminating light irradiated on a luminance point pixel having a luminance point defect and surfaceroughening a bottom of the processed concave portion to form a rough surface having a luminance reducing area.

In a preferred embodiment of the invention, the method further comprises a step of forming deep steps and shallow steps arranged alternately on the bottom of the processed concave portion.

In a preferred embodiment of the invention, the portion is surface-roughened by the use of an excimer laser beam.

In the state where the concave portion having the surface-roughened bottom is formed on the abovementioned portion, the illuminating light incident on the portion is scattered in ambient directions. As a result, the luminance of the luminance point pixel is lowered so as to be inconspicuous against ambient normal pixels. The scattered illuminating light is transmitted through the ambient normal pixels in the vicinity of the luminance point pixel, and is further scattered slightly when transmitting through a liquid crystal layer. Accordingly, the gradation level of the luminance point pixel is close to that of the ambient normal pixels. This also results in a situation where the luminance point pixel is inconspicuous against the ambient normal pixels. This means the luminance point defect is virtually compensated for.

In the state where the concave portion whose bottom is narrower than the upper opening is formed in the above-mentioned portion and the wall and the bottom of the concave portion are surface-roughened so as to have the light scattering characteristic, the illuminating light incident on the portion is scattered in ambient directions. Accordingly, the illuminating light transmitted through the luminance point pixel and projected on a display screen is reduced. Such a light scattering effect is also obtained in the state where the polygonal concave portion is formed in the above portion and the bottom thereof is surface-roughened.

In the case of the former in which the concave has the bottom narrower than the upper opening, a light scattering area per beam of the illuminating light is larger than in the case of the latter. Therefore, the light scattering characteristic is especially excellent in the former by the difference in the size of the light scattering area. Consequently, the former has an excellent light reducing effect as well as virtually compensating for the luminance point defect.

In the state where the central portion of the bottom of the concave portion has a better light scattering characteristic than the ambient portion, an amount of the illuminating light transmitted through the ambient portion can be approximated to an amount of the illuminating light transmitted through the normal pixels without sacrificing the compensation for the luminance point defect, as well as improving the light reducing effect at the central portion. Accordingly, the difference which is recognized between the ambient portion of the luminance point pixel and the normal pixels on the display screen is reduced. As a result, the luminance point pixel is inconspicuous against the normal pixels.

In the state where the concave portion whose bottom is close to the luminance point pixel is formed, the illuminating light incident on the luminance point pixel can be recognized with the human eye as a displaying light outgoing from an outer surface of the glass substrate even when observed from a different angle. In other words, the luminance point pixel can be observed in the form of being compensated for with any angle. This type of liquid crystal display device can be used not only as a projection device but also as a direct vision device. The projection device is equipped with a backlight as an illuminating device. The illuminating light, which is emitted from the backlight, is incident on one of the transparent substrates and is outgoing from the other of the transparent substrates through a twisted nematic liquid crystal layer, is recognized by a user as the displaying light (displayed image) of the liquid crystal display device.

BRIEF DESCRIPTION OF THE DRAWINGS

This invention may be better understood and its numerous objects and advantages will become apparent to those skilled in the art by reference to the accompanying drawings as follows:

FIG. 1 is a side view schematically illustrating a method of compensating for a luminance point defect of a liquid crystal display device as a first example according to the present invention.

FIG. 2 is a view showing that a luminance point pixel and a luminance point defect compensation area are on the same irradiation path of an illuminating light.

FIG. 3 is a cross sectional view illustrating a rough surface of the first example formed by excimer laser etching.

FIG. 18 is a view illustrating an eleventh example according to the present invention.

FIG. 19 is a partial cross sectional view illustrating a twelfth example according to the present invention.

FIG. 20 is a view illustrating the luminance point defect compensation area of a thirteenth example according to the present invention.

DESCRIPTION OF THE PREFERRED EMBODIMENTS

Figure 4:
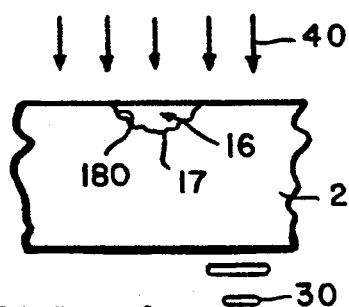
FIG. 4 is a partial cross sectional view illustrating a second example according to the present invention.

The present invention will be described by way of illustrating embodiments with reference to the accompanying drawings.

EXAMPLE 1

FIG. 1 schematically shows an example of a luminance point defect compensating method of a liquid crystal display device according to the present invention. Hereinafter, the liquid crystal display will be referred to as the "LCD display". A laser (light amplification of stimulated emission of radiation) beam 10 emitted from an excimer laser oscillator 9 passes through a slit pattern 11, is reflected by an ultraviolet reflective mirror 12, passes through a lens 13, and is converged to a luminance point defect compensation area 16 of a liquid crystal panel 1 placed on a table 14, whereby the laser beam 10 is irradiated on the luminance point defect compensation area 16. The liquid crystal panel 1 will be referred to as the "panel", and the luminance point defect compensation area 16 will be referred to as the "compensation area", hereinafter. As indicated by a shaded portion of FIG. 2, the compensation area 16 is on the same path of an illuminating light 40 with a luminance point pixel 5 generating a luminance point.

As shown in FIG. 3, the panel 1 comprises a pair of glass substrates. One of the glass substrates on which an illuminating light 40 emitted from a light source is incident will be referred to as the glass substrate 2. The other glass substrate from which the illuminating light 40 is outgoing will be referred to as the glass substrate 27. In Example 1, the compensation area 16 is located in the vicinity of an outer surface of the glass substrate 2. Inside the glass substrate 2, color filters 24 and a black matrix 25 are arranged in correspondence with pixels, and a counter electrode 26 is provided for applying a voltage to a liquid crystal.

Inside the glass substrate 27, pixel electrodes 28 arranged in a matrix and TFTs 29 for switching the voltage supply to the pixel electrodes 28 are provided. Enclosed between the glass substrates 2 and 27 is a twisted nematic liquid crystal layer 30 twisted by 90° or more.

The panel 1 of Example 1 is for use in a three panel-system projection LCD device. The color filters 24 are turned into the same color when incorporated in the panel 1. The three panels are composed, thereby realizing an RGB color display. The color filters 24 may be provided on the outer surface of the glass substrate 2. The incident direction of the laser beam 10 is identical with the incident direction of the illuminating light 40 on the panel 1.

The slit pattern 11 has a slit having an enlarged shape of the outline of the compensation area 16 so that the laser beam 10 passed through the slit pattern 11 is reduction-slit-exposed to be irradiated on the compensation area 16 with high precision. The use of such a slit pattern 11 has an advantage of forming a rough surface 17 of various shapes as will be described later. The table 14 is movable, for example, on a horizontal plane in X and Y directions which are perpendicular to each other so that the laser beam 10 is irradiated on a desired compensation area 16 by moving the table 14.

The luminance point pixel 5 is detected in a preceding step in the following way. The illuminating light 40 is irradiated on the panel 1 from the light source, an image displayed on the driven panel 1 is projected on a display screen, and the projected image on the display screen is inspected with the human eye.

The laser beam 10 is irradiated on the compensation area 16 of the glass substrate 2 in the direction shown by arrow 1, whereby the compensation area 16 is etched to form a concave portion 18 and simultaneously a bottom of the concave portion 18 is surface-roughened to form the rough surface 17 comprising a microscopic concave and convex pattern. The formation of the concave portion 18 and the rough surface 17 are both done by the use of an excimer laser beam. The rough surface 17 has a light scattering characteristic. When the illuminating light 40 is irradiated from the light source to the rough surface 17 in this state, the illuminating light 40 is scattered by the rough surface 17, whereby the luminance level of the luminance point pixel 5 is lowered on the display screen to a level close to that of normal pixels 50 disposed around the luminance point pixel 5.

Moreover, since the scattered illuminating light 40 is then slightly scattered in the liquid crystal layer 30, the illuminating light 40 is partially transmitted through the normal pixels 50 and then is returned toward the luminance point pixel 5. Consequently, the gradation level of the luminance point pixel 5 is lowered to be close to that of the normal pixels 50 on the display screen. For the above reasons, the luminance point pixel 5 is not recognized as the luminance point pixel 5, which means the luminance point defect of the luminance point pixel 5 is virtually compensated for.

In terms of the amount of light, the light which is incident on the panel after the rough surface is formed can appropriately be controlled to be within a range of 80 to 10% of the light incident before the rough surface 17 is formed. In Example 1, the amount of light incident after the rough surface 17 is formed is reduced to 50%±10% of the amount of light incident before the rough surface 17 is formed, thereby obtaining a satisfactory light reducing, namely, defect compensation effect.

The rough surface 17 may be formed by laser etching by the use of $CO_2$ or direct impression by the use of a diamond needle or a hard metal needle. However, excimer laser etching has the following advantages over the above methods.

Compared with the direct impression, the rough surface 17 can be formed more easily and with more uniform size of concave portions and convex portions.

While the laser etching by the use of $CO_2$ which uses heat and therefore damages the glass substrate in the vicinity of the compensation area 16, the excimer laser etching has no such problem.

Accordingly, excimer laser etching is most preferable in forming the rough surface 17.

Excimer laser etching employs, as a filler gas, ArF having an oscillating wavelength of 193 nm, KrF having an oscillating wavelength of 248 nm, XeCl having an oscillating wavelength of 308 nm or the like. Depending on the type of the filler gas, the pulse energy of the excimer laser oscillator 9 is different, and therefore the roughness of the rough surface 17 is different. It has been found out through the following experiment conducted by a team of researchers including the inventors that KrF is most preferable as the filler gas for the excimer laser etching to compensate for the luminance point defect.

In order to determine the most preferable filler gas, the rough surface was formed using various types of gas under the same pulse shot conditions. The surface was roughest when KrF was used and second roughest when ArF was used. When XeCl was used, the rough surface was not formed since the laser beam 10 was transmitted through the glass substrate 2. When observed with a microscope, the rough surface formed by the use of KrF was sand-like so as to satisfactorily restrict the luminance of the illuminating light 40.

Thereafter, the whole part of the compensation area 16 was uniformly irradiated by the laser beam 10 by the use of KrF in order to confirm that the luminance point disappeared. The luminance level of the luminance point was lowered to be close to that of the normal pixels 50.

EXAMPLE 2

FIG. 4 shows a second example according to the present invention. A semi-spherical concave portion 180 is formed in the compensation area 16, and then the rough surface 17 is formed on a bottom of the concave portion 180. This construction has the same light reducing effect, namely, the effect of lowering the luminance level of the rough surface 17 as in Example 1.

EXAMPLE 3

Figure 6:
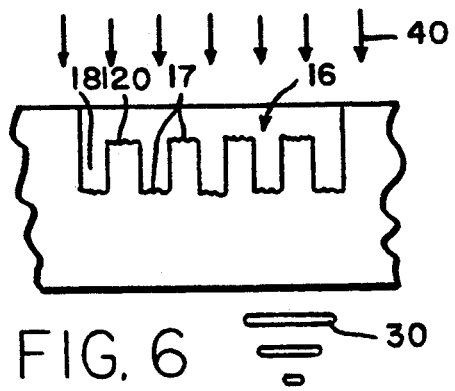
FIG. 6 is a cross sectional view of FIG. 5 taken along lines 6—6.
Figure 5:
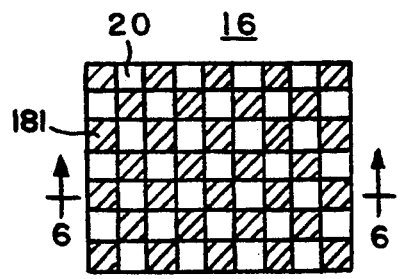
FIG. 5 is a view illustrating a luminance point defect compensation area of a third example according to the present invention.

FIGS. 5 and 6 show a third example according to the present invention. A plurality of concave portions 181 (shaded) and convexes 20 (not shaded) are formed in a fine portion of the compensation area 16, and the rough surface 17 is formed on a bottom of each concave portion 181 and on a surface of each convex 20. The size of the fine portion, which is different depending on the type of the panel 1, is approximately 120 $\mu$m $\times$ 100 $\mu$m at the minimum and approximately 250 $\mu$m $\times$ 230 $\mu$m at the maximum.

In this construction, since the rough surface 17 is formed in two steps, the illuminating light 40 from the light source can be further scattered and so reduced. This construction is convenient in conforming to the future technological trend. Since it is predicted that the metal halide lamp used As the light source will be increased in luminance in the future, it is necessary to further improve the light reducing effect.

In this construction, the luminance point defect is compensated for by irradiating the laser beam 10 on the whole part of the compensation area 16 uniformly and irradiating the laser beam 10 again through a mesh slit pattern mask.

EXAMPLE 4

Figure 7:
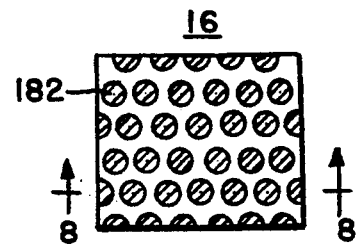
FIG. 7 is a view illustrating a luminance point defect compensation area of a fourth example according to the present invention.
Figure 8:
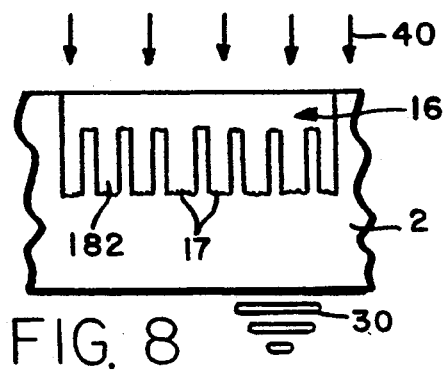
FIG. 8 is a cross sectional view of FIG. 7 taken along lines 8—8.

FIGS. 7 and 8 show a fourth example according to the present invention. A plurality of concave portions 182 (shaded) are formed in the compensation area 16, and the rough surface 17 is formed on a bottom of each concave portion 182. In this construction, the luminance point defect is compensated for in the same way and the same light reducing effect is obtained as in Example 3.

EXAMPLE 5

Figure 9:
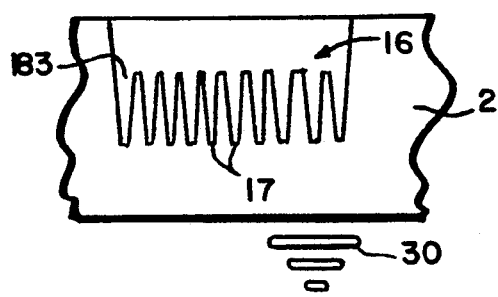
FIG. 9 is a partial cross sectional view illustrating a fifth example according to the present invention.

FIG. 9 shows a fifth example according to the present invention. A plurality of concave portions 183 are formed in a tapered state in the compensation area 16, and the rough surface 17 is formed on a bottom of each concave portion 183. In this construction, the luminance point defect is compensated for in the same way and the same light reducing affect is obtained as in Example 3.

EXAMPLE 6

Figure 10:
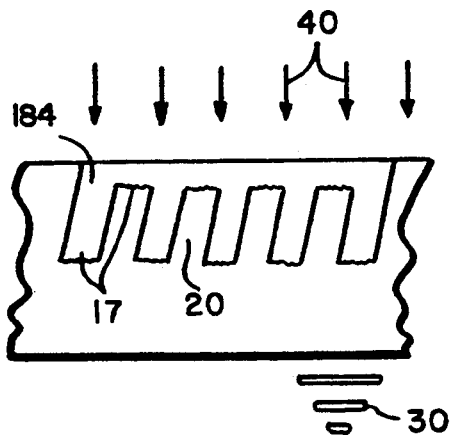
FIG. 10 is a partial cross sectional view illustrating a sixth example according to the present invention.

FIG. 10 shows a sixth example according to the present invention. A plurality of concave portions 184 and convexes 20 extended diagonally are formed in the compensation area 16 by irradiating the laser beam 10 with a specified angle with respect to a surface of the compensation area 16, and the rough surface 17 is formed on a bottom of each concave portion 184 and a surface of each convex 20. In this construction, the same light reducing effect as in Example 3 is obtained.

EXAMPLE 7

Figure 11:
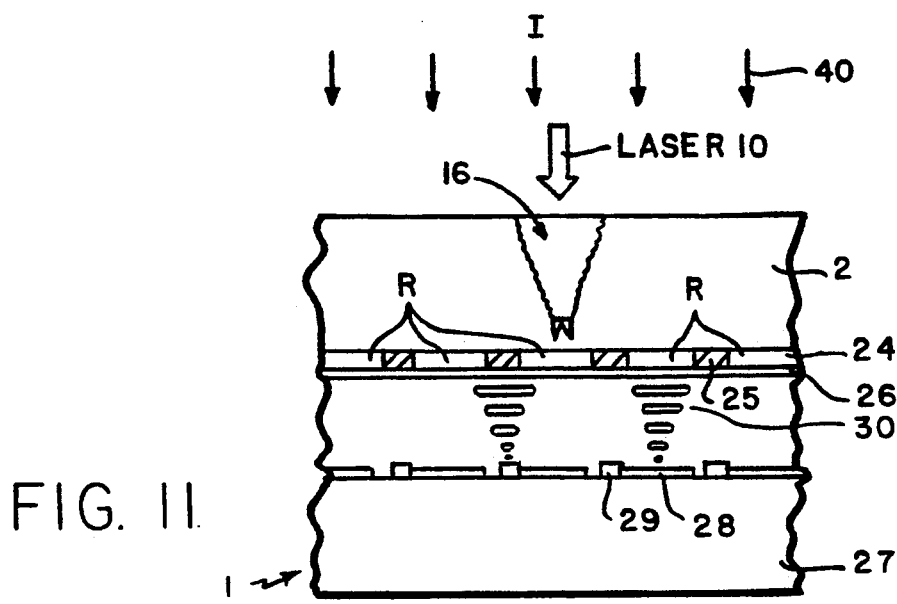
FIGS. 11 and 11A are partially enlarged cross sectional view illustrating a seventh example according to the present invention.
Figure 11A:
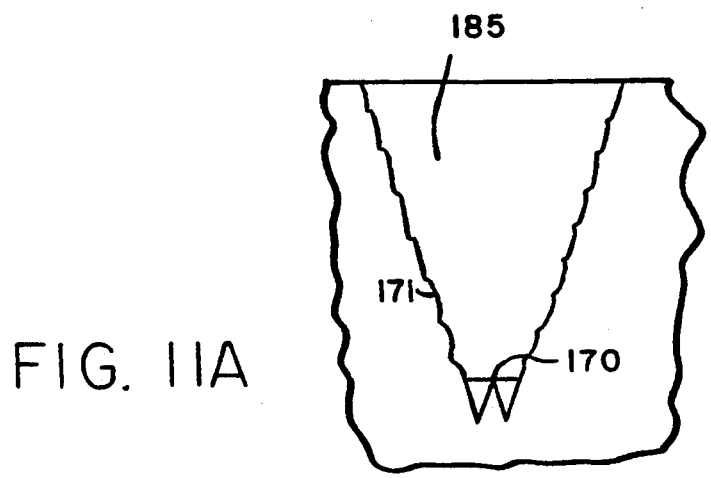
Figure 12:
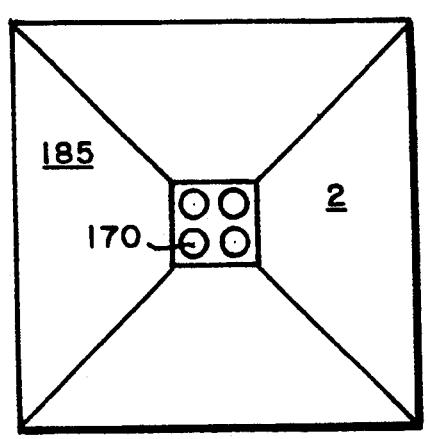
FIG. 12 is a partial top view of FIG. 11.

FIGS. 11 and 12 show a seventh example according to the present invention. An inverted trapezoidal pyramid shaped concave portion 185 narrowing at a bottom thereof is formed in the compensation area 16 in correspondence with the luminance point pixel 5, and rough surfaces 170 and 171 are formed on a bottom and a slanted wall of the concave portion 185. In this way, the illuminating light 40 transmitted through the luminance point pixel 5 is further reduced. This construction is also convenient in conforming to the aforementioned future technological trend. The concave portion 185 and the rough surfaces 170 and 171 are formed in the following way by the use of excimer laser etching.

Figure 13:
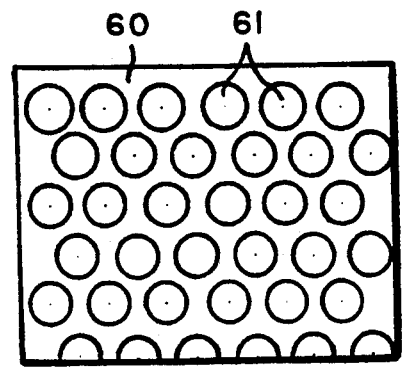
FIG. 13 is a view illustrating a slit pattern mask.

First, the reduction ratio of slit-exposing the laser beam 10 through the slit pattern 11 (FIG. 1) and the energy density of the laser beam 10 (FIG. 1) are set to an appropriate level. Then, the laser beam 10 is irradiated from the excimer lager oscillator 9 on the compensation area 16, thereby forming the concave portion 185. A mesh slit pattern mask 60 having round holes 61 as shown in FIG. 13 is inserted into the slit pattern 11, and the laser beam 10 is again irradiated on the concave portion 185, thereby simultaneously forming the sawtooth rough surfaces 171 on the wall and the mesh-like rough surface 170 on the bottom of the concave portion 185.

In this construction, in which the compensation area 16 has the concave portion 185 with the rough surfaces 170 and 171, a scattering area of the illuminating light 40 incident on the compensation area 16 per beam is larger than of FIG. 3. Accordingly, the light scattering characteristic, by which the illuminating light 40 is scattered in ambient directions, is improved by the difference in the size of the scattering areas, thereby also improving the effect of reducing the illuminating light 40, namely, of lowering the luminance.

The concave portion 185 preferably has an upper opening of approximately 250 μm×250 μm, a slanting angle of approximately 5° to 20°, and a depth of approximately 200 μm or more. It has been found out that the light reducing effect can be set at approximately 80% or more by forming the concave portion 185 having such specifications. The light reducing effect of the construction shown in FIG. 3 is approximately 50%.

In Example 7, the panel 1 for use in the three panel-system projection LCD device is used.

EXAMPLE 8

Figure 14:
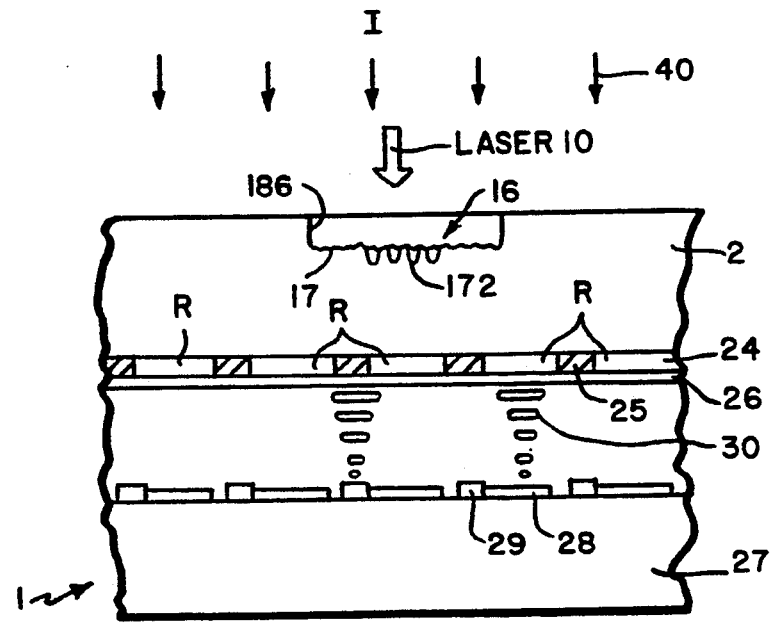
FIG. 14 is a cross sectional view illustrating an eighth example according to the present invention.

FIG. 14 shows an eighth example according to the present invention. A mesh-like central rough surface 172 is formed in a central portion of the bottom of the rough surface 17, the central rough surface 172 being deeper than the rough surface 17.

The central rough surface 172 is formed in the following way. As shown in FIG. 14, the laser beam 10 is irradiated on the compensation area 16 in the direction of arrow 1. The compensation area 16 is etched to form a concave portion 186 and simultaneously a bottom of the concave portion 186 is surface-roughened to form the rough surface 17 comprising a microscopic concave and convex pattern.

Then, the mesh slit pattern mask 60 (FIG. 13) is inserted into the slit pattern 11, and the laser beam 10 is irradiated only on the central portion of the rough surface 17, thereby forming the mesh central rough surface 172 which is deeper than the rough surface 17.

In this construction, since the central portion of the rough surface 17 has deeper concave portions than an ambient portion thereof, the light scattering area of the central portion is larger than that of the ambient portion. In other words, the light reducing effect of the central portion is better than that of the ambient portion. Accordingly, a center of the luminance point pixel 5 is not conspicuous against the normal pixels 50 around the luminance point pixel 5.

Moreover, since the amount of light transmitted through an ambient portion of the luminance point pixel 5 can be slightly reduced compared with the amount of light transmitted through the normal pixels 50, the difference recognized between the ambient portion of the luminance point pixel 5 and the normal pixels 50 is reduced.

For the above reasons, the construction of Example 8 makes the luminance point pixel 5 inconspicuous against the normal pixels 50 around the luminance point pixel 5. The further light reducing effect realized in the central portion of the luminance point pixel 5 is convenient in conforming to the future technological trend.

It has been found out that the amount of light is set to approximately 80% by setting the light reducing effect at approximately 20 to 40%.

EXAMPLE 9

Figure 15:
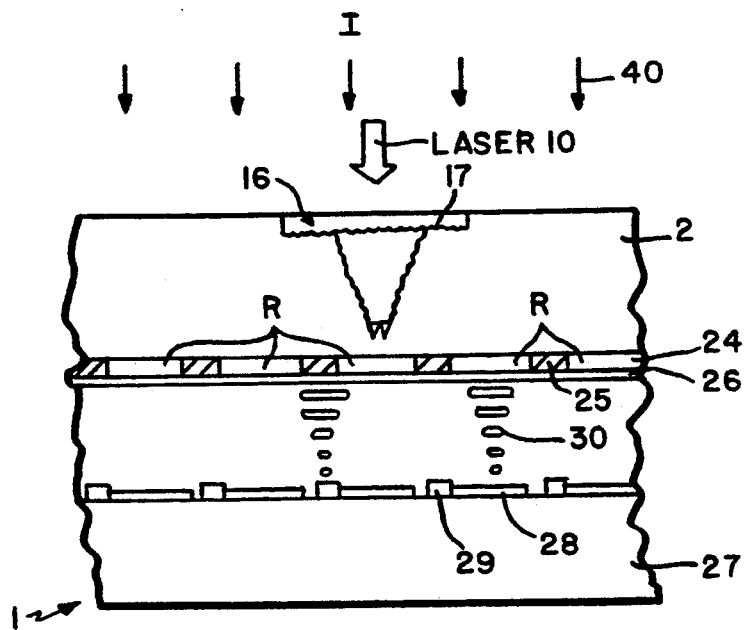
FIGS. 15 and 15A are partially enlarged cross sectional view illustrating a ninth example according to the present invention.
Figure 15A:
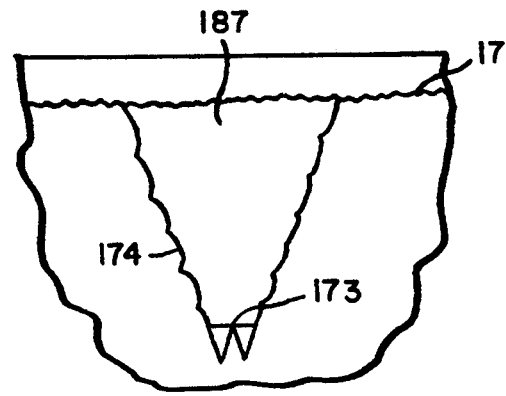

FIG. 15 shows a ninth example according to the present invention. A rectangular pyramid central concave portion 187 narrowing at a bottom thereof is formed in a central portion of the rough surface 17, and rough surfaces 173 and 174 are formed on a bottom and a slanted wall of the concave portion 187. In this way, the illuminating light 40 transmitted through the luminance point pixel 5 is further reduced. The concave portion 187 and the rough surfaces 173 and 174 are formed in the following way by the use of excimer laser etching.

First, the laser beam 10 is reduction-slit-exposed on the rough surface 17 in the same way as in Example 6, thereby forming the central concave portion 187. A mesh slit pattern mask 60 (FIG. 13) is inserted into the slit pattern 11, and the laser beam 10 is again irradiated only on the central portion of the rough surface 17, thereby simultaneously forming the central concave portion 187, the sawtooth rough surfaces 174 on the wall and the mesh-like rough surface 173 on the bottom of the concave portion 187. This construction has the same effect of reducing the Illuminating light 40 as in Example 8.

The concave portion 187 preferably has an upper opening of approximately 250 μm×250 μm, a slanting angle of approximately 5 to 20%, and a depth of approximately 250 μm, it has been found out that the light reducing effect can be set at approximately 80% or more by forming the concave portion 187 having such specifications.

EXAMPLE 10

Figure 16:
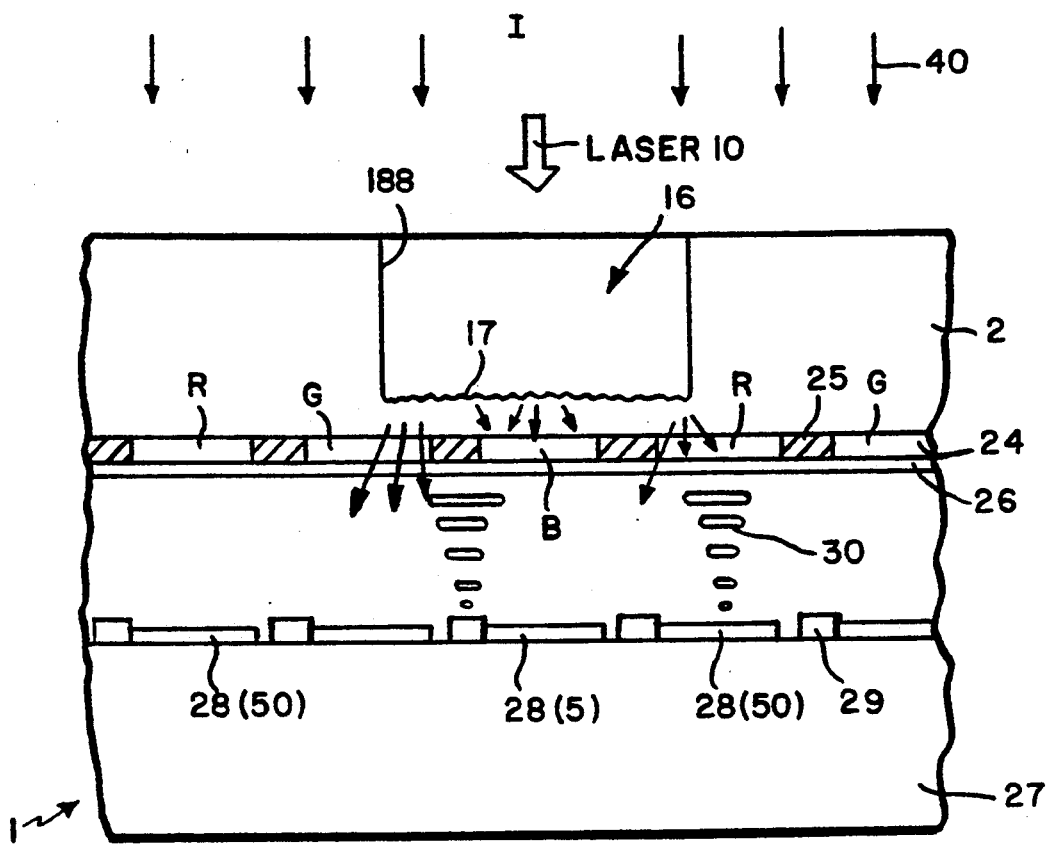
FIG. 16 is a cross sectional views illustrating a tenth example according to the present invention.
Figure 17:
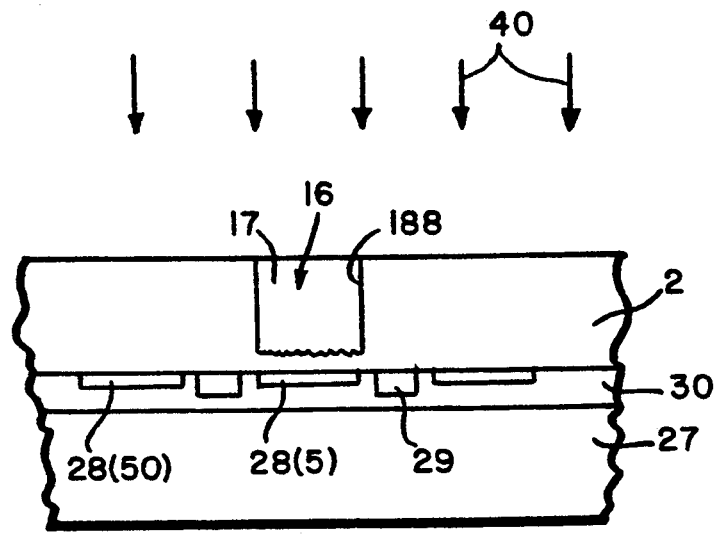
FIG. 17 is a cross sectional view illustrating the tenth example in a size closer to the real one than FIG. 16.

FIGS. 16 and 17 show a tenth example according to the present invention. In the panel 1 of Example 10, red (R), green (G) and blue (B) color filters 24' are alternately arranged. The panel 1 of Example 10 is usable in a direct vision LCD device as well as in the projection LCD device.

RGB color filters 24' and a black matrix 25 are arranged in correspondence with the pixels, and the counter electrode 26 is provided for applying a voltage to the liquid crystal. The RGB color filters 24' may be provided on the outer surface of the glass substrate 2.

Inside the glass substrate 27, the pixel electrodes 28 arranged in a matrix and the TFTs 29 for switching the voltage supply to the pixel electrodes 28 are provided. Enclosed between the glass substrates 2 and 27 is the twisted nematic liquid crystal layer 30 twisted by 90° or more.

The luminance point pixel 5 is generated in a portion of the pixel electrodes 28. In FIG. 16, the thickness of the twisted nematic liquid crystal layer 30 with respect to the thicknesses of the glass substrates 2 and 27 are larger than the real one. FIG. 17 illustrates the relationship among the above thicknesses which is closer to the real one. Although not shown in FIGS. 16 and 17, polarizing plates are disposed outside of the glass substrates 2 and 27.

The compensation area 16 has a concave portion 188 having the rough surface 17. As shown in FIG. 17, the rough surface 17 is close to the luminance point pixel 5. The concave portion 188 is formed in the following way so as to locate a bottom thereof close to the luminance point pixel 5.

As shown in FIG. 16, the laser beam 10 Is irradiated on the compensation area 16 in the direction of arrow I, whereby the irradiated portion is laser-etched and a bottom of the compensation area 16 is made close to a bottom of the glass substrate 2. In other words, the laser etching forms the concave portion 188 having the bottom close to the luminance point pixel 5 and further forms the rough surface 17 comprising microscopic concave portions and convexes. The shape and the depth of the concave portion 188 and the roughness of the rough surface 17 can be adjusted by employing an appropriate slit pattern 11 (FIG. 1) and setting the energy density of the laser beam 10 to an appropriate level.

When the illuminating light 40 is Irradiated on the concave portion 188 having the rough surface 17 from a backlight, the incident light is scattered by the rough surface 17, thereby reducing the light transmitted through the luminance @point pixel 5 which is closely opposed to the rough surface 17. Accordingly, the illuminating light 40 transmitted through the luminance point pixel 5, namely, the luminance level of the light transmitted through the luminance point pixel 5 obtained when the panel 1 is used in the projection LCD device is confirmed as being as low as the luminance level of the light transmitted through the normal pixels 50 when viewed with the human eye from outside of the glass substrate 27.

Further, a rough surface is formed even on a portion of the compensation area 16 opposed to the normal pixel 50 adjacent to the luminance point pixel 5. A portion of the light transmitted through such a rough surface is partially scattered toward the adjacent normal pixel 50. Consequently, the tone of the adjacent normal pixel 50 is overlapped on the luminance point pixel 5 when observed by the human eye, whereby the gradation level of the luminance point pixel 5 is close to that of the normal pixels 50 around the luminance point pixel 5. This means that the luminance point defect of the luminance point pixel 5 is compensated for so as to be inconspicuous.

Since the rough surface 17 is close to the luminance point pixel 5, the illuminating light 40 Incident on the luminance point pixel 5 can be confirmed with the human eye as displaying light outgoing from an outer surface of the glass substrate 27 even when observed from different angles. Since the illuminating light 40 can be observed in the state where the calescence point defect is compensated for, the panel 1 of Example 10 can be used In the direct vision LCD device as well as in the projection LCD device.

The panel 1 of Example 10 may be equipped with a glass substrate including TFTs disposed on a light incident side and a glass substrate including the color filters disposed on a light outgoing side. In such a case, the compensation area 16 is formed in the glass substrate including the color filters.

EXAMPLE 11

FIG. 18 shows an eleventh example according to the present invention. In this and all the following examples, the compensation area 16 is located in the vicinity of the outer surface of the glass substrate 27 from which the illuminating light 40 is outgoing. The compensation area 16 is on the same irradiation path of the illuminating light 40 with the luminance point pixel 5.

Inside the glass substrate 2 on which the illuminating light 40 is incident, the color filters 24 and the black matrix 25 are arranged in correspondence with the pixels, and the counter electrode 26 is provided for applying a voltage to the liquid crystal. The color filters 24 may be provided on the outer surface of the glass substrate 2.

Inside the glass substrate 27, the pixel electrodes 28 arranged in a matrix and the TFTs 29 for switching the voltage supply to the pixel electrodes 28 are provided. Enclosed between the glass substrates 2 and 27 is the twisted nematic liquid crystal layer 30 twisted by 90° or more. The panel 1 of Example 11 is for use in the three panel-system projection LCD device.

The laser beam 10, the intensity of which is controlled, is irradiated on the compensation area 16 of the glass substrate 27 in the direction shown by arrow $I_1$, whereby the compensation area 16 is etched to form a concave portion 19 and simultaneously a bottom of the concave portion 19 is surface-roughened to form the rough surface 17 comprising a microscopic concave and convex pattern. When the illuminating light 40 is Irradiated from the light source in the direction of arrow $I_2$ to the rough surface 17 in this state, the illuminating light 40 is transmitted through the luminance point pixel 5, is scattered by the rough surface 17, and radiates toward the display screen. Therefore, the amount of light sent from the luminance point pixel 5 to the observer is reduced in accordance with the roughness of the rough surface 17, so that the luminance level of the luminance point pixel 5 is lowered to be close to that of the normal pixels 50. As a result, the luminance point pixel 5 is not recognized as the luminance point pixel 5. This means the luminance point defect of the luminance point pixel 5 is virtually compensated for.

In terms of the amount of light, the light which is incident on the panel 1 after the rough surface 17 is formed can appropriately be controlled to be within a range of 80 to 10% of the light incident before the rough surface 17 is formed. In Example 11, the amount of light incident after the rough surface 17 lo is formed is reduced to 50% ± 10% of the amount of light Incident before the rough surface 17 is formed, thereby obtaining a satisfactory light reducing, namely, defect compensation effect.

The rough surface 17 may be formed by laser etching by the use Of $CO_2$ Or direct impression by the use of a diamond needle or a hard metal needle. However, excimer laser etching has the aforementioned advantages over the above methods.

EXAMPLES 12

FIG. 19 shows a twelfth example according to the present invention. A semi-spherical concave portion 190 is formed in the compensation area 16, and then the rough surface 17 is formed on a bottom of the concave portion 190. This construction has the same light reducing effect as in Example 11.

EXAMPLE 13

Figure 21:
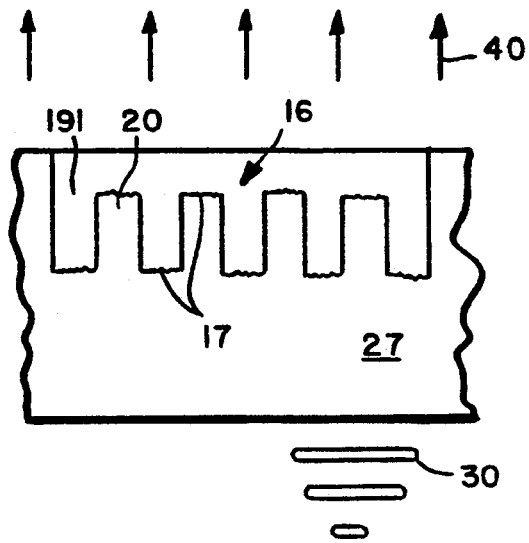
FIG. 21 is across sectional view of FIG. 20 taken along lines 21—21.

FIGS. 20 and 21 show a thirteenth example according to the present invention. A plurality of concave portions 191 (shaded) and convexes 200 (not shaded) are formed in a fine portion of the compensation area 16, and the rough surface 17 is formed on a bottom of each concave portion 191 and on a surface of each convex 200. The size of the fine portion, which is different depending on the type of the panel 1, is approximately 120 $\mu$m × 100 $\mu$m at the minimum and approximately 250 $\mu$m × 230 $\mu$m at the maximum.

In this construction, since the rough surface 17 is formed in two steps, the illuminating light 40 from the light source can be further scattered and so reduced. This construction is convenient in conforming to the future technological trend.

In this construction, the luminance point defect is compensated for by irradiating the laser beam 10 on the whole part of the compensation area 16 uniformly and irradiating the laser beam 10 again through a mesh slit pattern mask 60 (FIG. 13).

EXAMPLE 14

Figure 23:
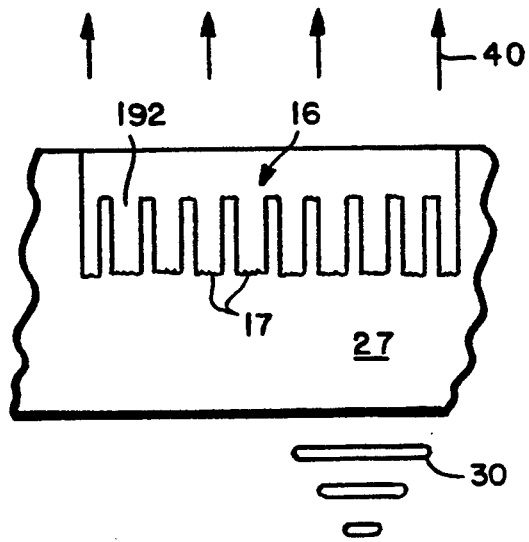
FIG. 23 is a cross sectional view of FIG. 22 taken along lines 23—23.
Figure 22:
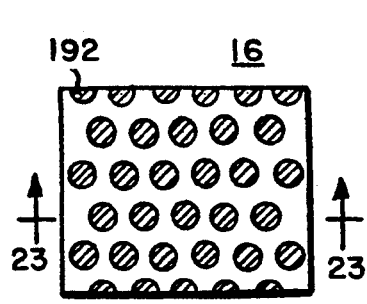
FIG. 22 is a view illustrating the luminance point defect compensation area of a fourteenth example according to the present invention.

FIGS. 22 and 23 show a fourteenth example according to the present invention. A plurality of concave portions 192 (shaded) are formed in the compensation area 16, and the rough surface 17 is formed on a bottom of each concave portion 192. In this construction, the luminance point defect is compensated for in the same way and the same light reducing effect is obtained as in Example 13.

EXAMPLE 15

Figure 24:
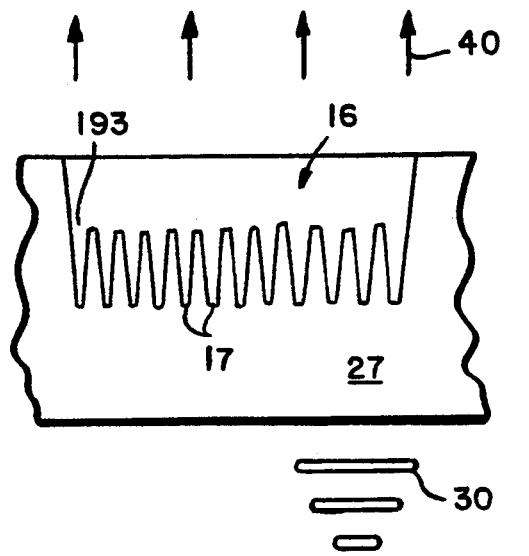
FIG. 24 is a partial cross sectional view illustrating a fifteenth example according to the present invention.

FIG. 24 shows a fifteenth example according to the present invention. A plurality of concave portions 193 are formed in a tapered state In the compensation area 16, and the rough surface 17 is formed on a bottom of each concave portion 193. In this construction, the luminance point defect is compensated for in the same way and the same light reducing effect is obtained as in Example 13.

EXAMPLE 16

Figure 25:
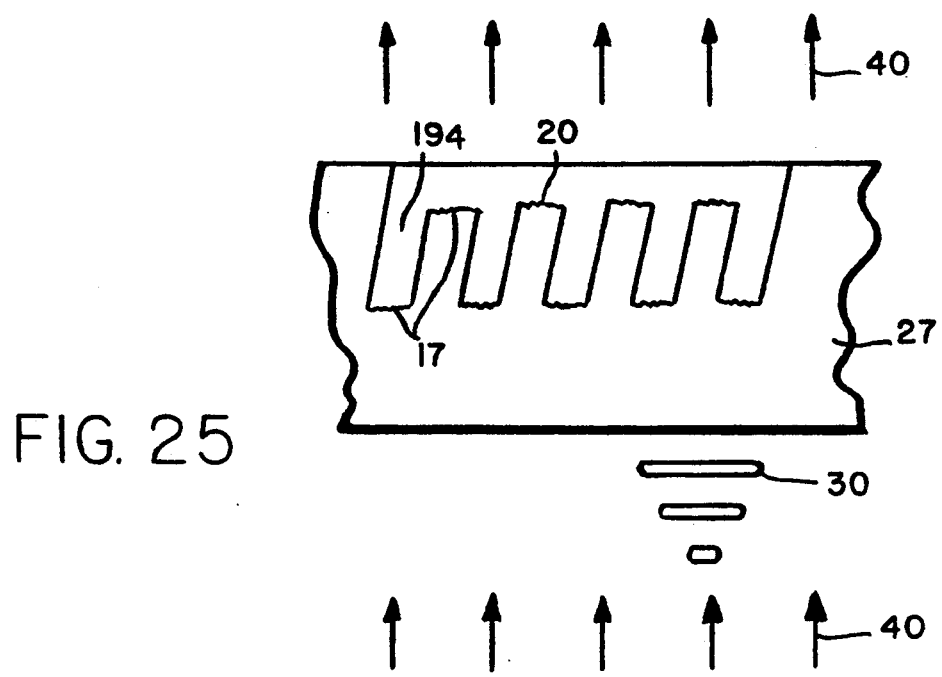
FIG. 25 is a partial cross sectional view illustrating a sixteenth example according to the present invention.
Figure 26:
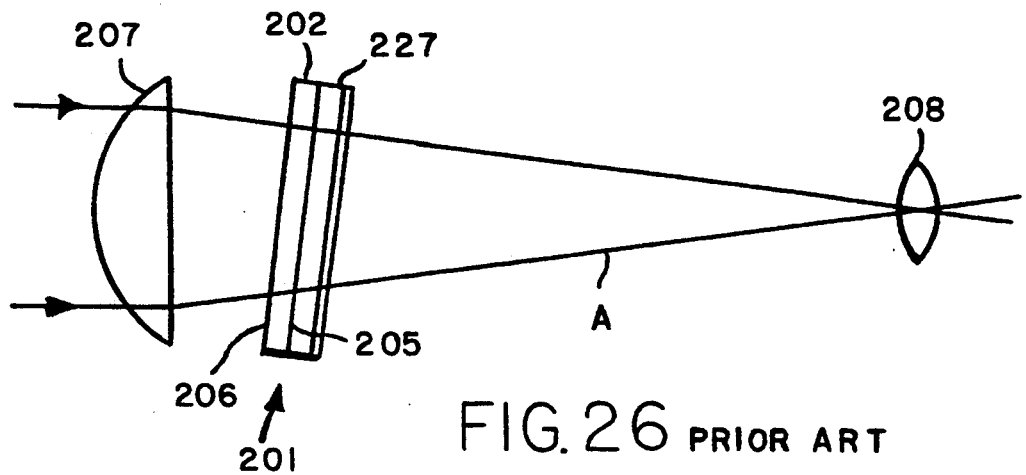
FIG. 26 is a side view illustrating a conventional method of compensating for a luminance point pixel defect.
Figure 27:
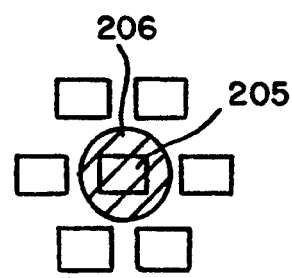
FIG. 27 is a view showing that a luminance point pixel and a luminance point defect compensation area are on the same irradiation path of an illuminating light in the conventional method.
Figure 7:
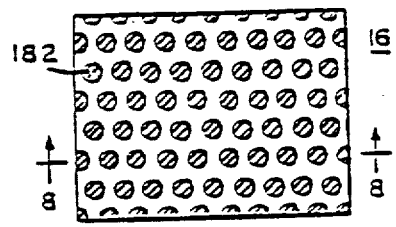
Figure 8:
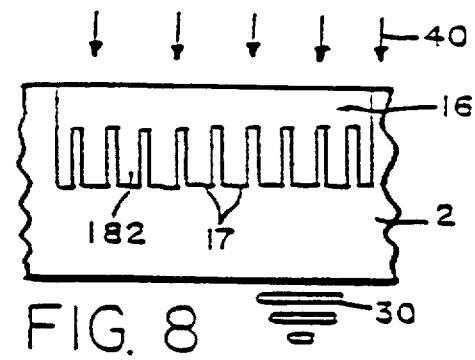
Figure 9:
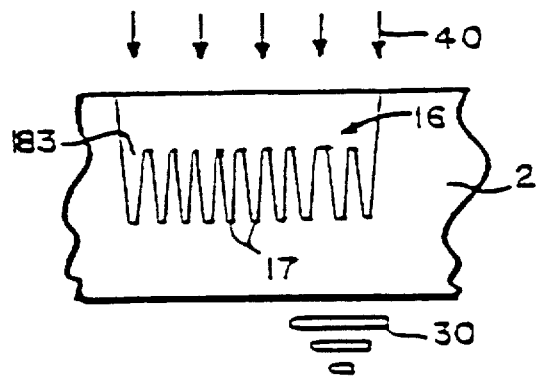
Figure 16:
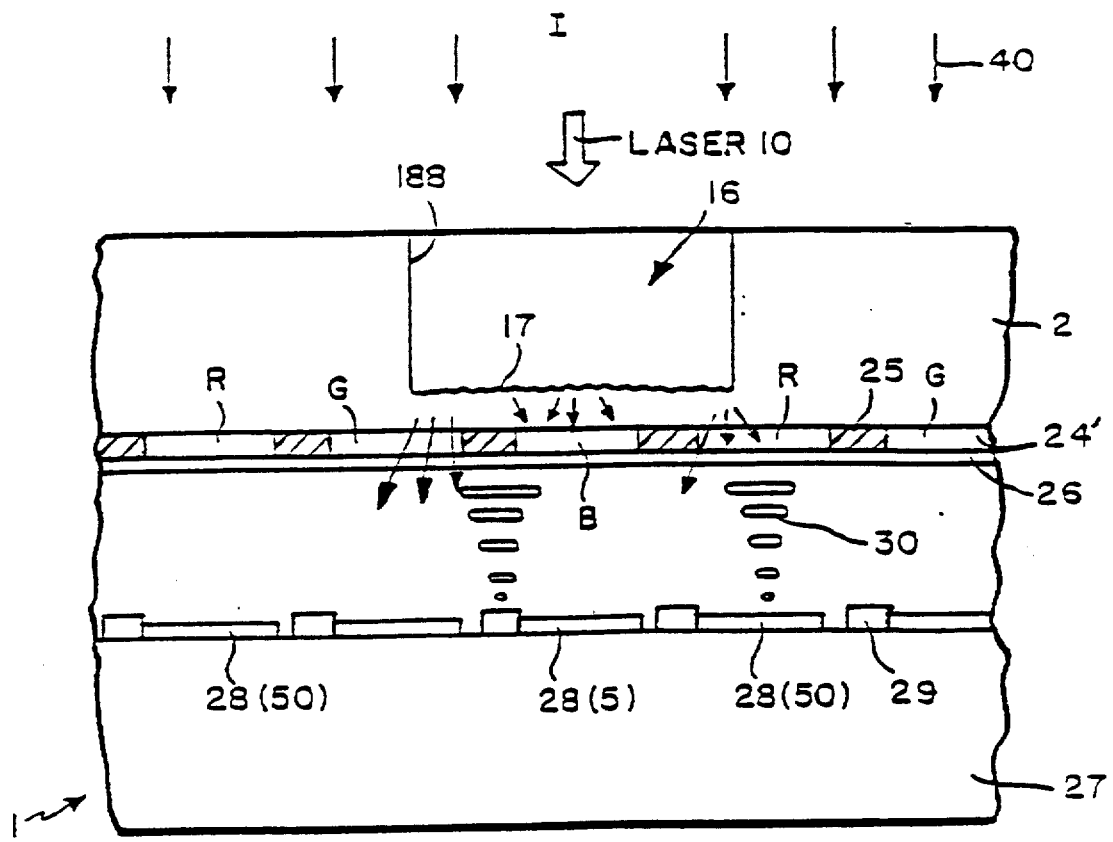
Figure 17:
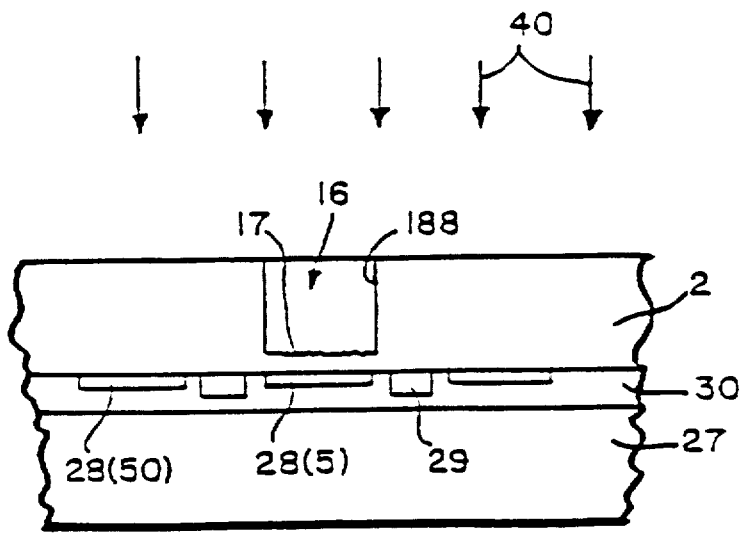
Figure 22:
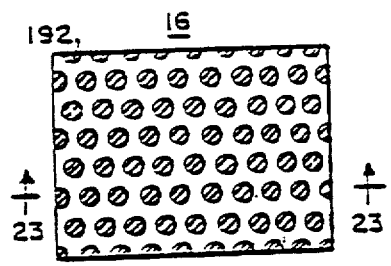
Figure 25:
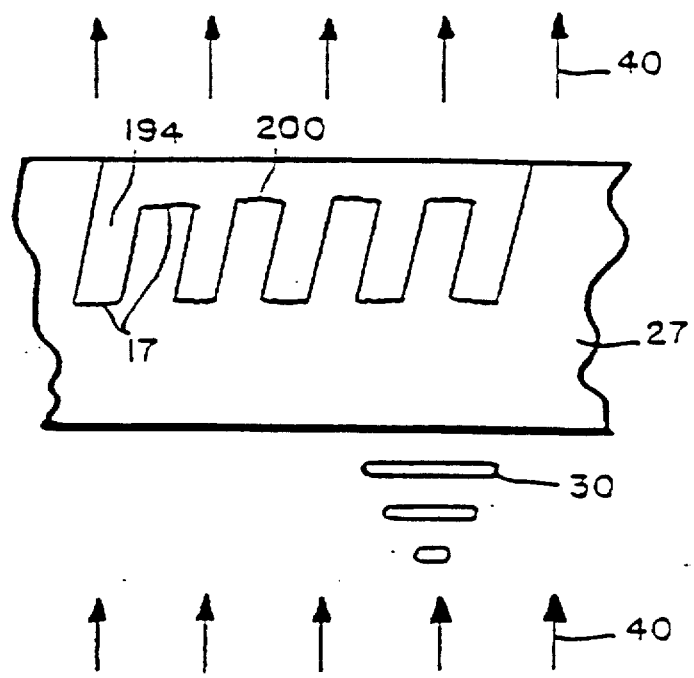

FIG. 25 shows a sixteenth example according to the present invention. A plurality of concave portions 194 extended diagonally and convexes 200 are formed in the compensation area 16 by irradiating the laser beam 10 with a specified angle with respect to a surface of the compensation area 16, and the rough surface 17 is formed on a bottom of each concave portion 194 and a surface of each convex 200. In this construction, the same light reducing effect as in Example 13 is obtained.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid crystal display device comprising a transmission liquid crystal panel including a liquid crystal enclosed between a pair of transparent substrates and pixels for a display arranged in a matrix and light source means for illuminating the display from a back of the transmissive liquid crystal panel, wherein a processed concave portion is formed in a surface of one of the transparent substrates on which light from the light source means is incident, the portion being located in an irradiation path of the light illuminating a luminance point pixel having a luminance point defect, and the processed concave portion has a bottom which is rough so as to have a light scattering characteristic.

2. The liquid crystal display device according to claim 1, wherein the bottom of the processed concave portion comprises deep steps and shallow steps arranged alternately.

3. The liquid crystal display device according to claim 1, wherein the processed concave portion is narrower at the bottom thereof than at an upper opening thereof, and a side wall and the bottom of the processed concave portion are rough so as to have the light scattering characteristic.

4. The liquid crystal display device according to claim 3, wherein the side wall has a sawtooth-like roughness and the bottom has a mesh-like roughness.

5. The liquid crystal display device according to claim 1, wherein the bottom of the processed concave portion is formed to have a light scattering characteristic which is greater at a central portion thereof than that at an ambient portion thereof.

6. The liquid crystal display device according to claim 5, wherein the central portion of the bottom of the processed concave portion has a mesh-like roughness.

7. The liquid crystal display device according to claim 5, wherein the central portion of the bottom of the processed concave portion has a second processed concave portion therein which is deeper than the ambient portion, and is tapered to be narrower at a deepest end than at an upper opening thereof.

8. The liquid crystal display device comprising a transmissive liquid crystal panel including a liquid crystal enclosed between a pair of transparent substrates and pixels for a display arranged in a matrix and light source means for illuminating the display from a back of the transmissive liquid crystal panel, wherein a processed concave portion is formed in a portion of a surface of one of the transparent substrates on which light from the light source means is incident, the portion being located in an irradiation path of the light illuminating a luminance point pixel having a luminance point defect, and the processed concave portion has a bottom at a depth sufficient to be proximate to the luminance point pixel, wherein said bottom is rough so as to have a light scattering characteristic.

9. The liquid crystal display device according to any one of claims 1 and 8, wherein the processed concave portion having the bottom which is rough so as to have a light scattering characteristic is formed by the use of an excimer laser beam.

10. A liquid crystal display device comprising a transmissive liquid crystal panel including a liquid crystal enclosed between a pair of transparent substrates and pixels for a display arranged in a matrix and light source means for illuminating the display from a back of the transmissive liquid crystal panel, wherein a processed concave portion is formed in a surface of one of the transparent substrates from which light from the light source means is outgoing, the portion being located in an irradiation path of the light illuminating a luminance point pixel having a luminance point defect, and wherein the processed concave portion has a bottom which is rough so as to minimize an amount of light emitted from the luminance point defect.

11. The liquid crystal display device according to claim 10, wherein the bottom of the processed concave portion comprises deep steps and shallow steps arranged alternately.

12. The liquid crystal display device according to claim 10, wherein the bottom of the processed concave portion is formed to have a light scattering characteristic which is greater at a central portion thereof than that at an ambient portion thereof.

13. The liquid crystal display device according to claim 12, wherein the central portion of the bottom has a mesh-like roughness.

14. A method for compensating for a defect of a liquid crystal display device comprising a transmissive liquid crystal panel including a liquid crystal enclosed between a pair of transparent substrates and pixels for a display arranged in a matrix and light source means for illuminating the display from a back of the transmissive liquid crystal panel, the method comprising the steps of:

detecting a luminance point defect by illuminating the transmissive liquid crystal display pane;

forming a processed concave portion in a surface of one of the transparent substrates on which light from the light source means is incident, the portion being located in an irradiation path of the light illuminating the luminance point pixel having a luminance point defect; and forming a rough surface having a light scattering area by surface-roughening a bottom of the processed concave portion.

15. The method of compensating for a defect of a liquid crystal display device according to claim 14, further comprising a step of forming deep steps and shallow steps arranged alternately on the bottom of the processed concave portion.

16. A method of compensating for a defect of a liquid crystal display device comprising a transmissive liquid crystal a panel including a liquid crystal enclosed between a pair of transparent substrates and pixels for a display arranged in a matrix and light source means for illuminating the display from a back of the transmissive liquid crystal panel, the method comprising the steps of:

detecting a luminance point defect by illuminating the transmissive liquid crystal display panel;

forming a processed concave portion which is narrower at a bottom thereof than at an upper opening thereof in a portion of a surface of one of the transparent substrates on which light from the light source means is incident, the processed concave portion being located in an irradiation path of the light illuminating a luminance point pixel having the luminance point defect; and forming a light scattering area by surface-roughening a wall and the bottom of the processed concave portion.

17. The method of compensating for a defect of a liquid crystal display device according to claim 16, wherein the wall is surface-roughened to be sawtooth-like and the bottom is surface-roughened to be mesh-like.

18. A method of compensating for a defect of a liquid crystal display device comprising a transmissive liquid crystal panel including a liquid crystal enclosed between a pair of transparent substrates and pixels for a display arranged in a matrix and light source means for illuminating the display from a back of the transmissive liquid crystal panel, the method comprising the steps of:

detecting a luminance point defect by illuminating the transmissive liquid crystal display panel;

forming a processed concave portion which has a rough bottom having a light scattering characteristic by surface-roughening a portion of a surface of one of the transparent substrates on which light from the light source means is incident, the portion being located in an irradiation path of the light illuminating the luminance point pixel having a luminance point defect; and forming another processed concave portion at a central portion of the rough bottom of the processed concave portion, the another processed concave portion being deeper than the rough surface of the processed concave portion.

19. A method of compensating for a defect of a liquid crystal display device comprising a transmissive liquid crystal panel including a liquid crystal enclosed between a pair of transparent substrates and pixels for a display arranged in a matrix and light source means for illuminating the display from a back of the transmissive liquid crystal panel, the method comprising the steps of:

detecting a luminance point defect by illuminating the transmissive liquid crystal display panel; and forming a processed concaved portion having a bottom which is close to a luminance point pixel having a luminance point defect and which is rough so as to have a light scattering characteristic by surface-roughening a portion of a surface of one of the transparent substrates on which light from the light source means is incident, the surface-roughened portion being located in an irradiation path of the light incident on the luminance point pixel having the luminance point defect.

20. The method of compensating for a defect of a liquid crystal display device according to any one of claims 14, 15, 16, 17, 18 and 19, wherein the processed concave portion is surface-roughened by way of laser etching by the use of an excimer laser beam.

21. The method of compensating for a defect of a liquid crystal display device according to claim 20, wherein the excimer laser beam is irradiated on a defect compensation area by way of reduction-slit-exposure through a slit pattern having a slit of an enlarged shape of an outline of the defect compensation area.

22. A method of compensating for a defect of a liquid crystal display device comprising a transmissive liquid crystal panel including a liquid crystal enclosed between a pair of transparent substrates and pixels for a display arranged in a matrix and light source means for illuminating the display from a back of the transmissive liquid crystal panel, the method comprising the steps of:

detecting a luminance point defect by illuminating the transmissive liquid crystal display panel; and forming a processed concave portion in a surface of one of the transparent substrates from which light from light source means is outgoing, the portion being located in an irradiation path of the light illuminating a luminance, point pixel having the luminance point defect and surface-roughening a bottom of the processed concave portion to make a rough surface having a luminance reducing characteristic.

23. The method of compensating for a defect of a liquid crystal display device according to claim 22, further comprising a step of forming deep steps and shallow steps arranged alternately on the bottom of the processed concave portion.

24. The method of compensating for a defect of a liquid crystal display device according to claim 22, wherein the portion is surface-roughened by the use of an excimer laser beam:

* * * * *

UNITED STATES PATENT AND TRADEMARK OFFICE
CERTIFICATE OF CORRECTION

PATENT NO. : 5,280,374  
DATED : January 18, 1994  
INVENTOR(S) : Nakai, et al.

Page 1 of 5

It is certified that error appears in the above-indentified patent and that said Letters Patent is hereby corrected as shown below:

In the drawings, please delete Figures 7, 8, 9, 16, 22 and 25 to be replaced with the corrected Figures 7, 8, 9, 16, 17, 22 and 25, as shown on the attached pages.

Column 15, lines 46-47, please replace "transmission" with --transmissive--.

Column 17, line 4, please replace "pane" with --panel--.

Signed and Sealed this

Third Day of October, 1995

Attest:

BRUCE LEHMAN

*Attesting Officer*  *Commissioner of Patents and Trademarks*